July 19, 1966     O. HACHTMANN     3,261,565
COUPLING DEVICE
Filed Feb. 14, 1964     5 Sheets-Sheet 1
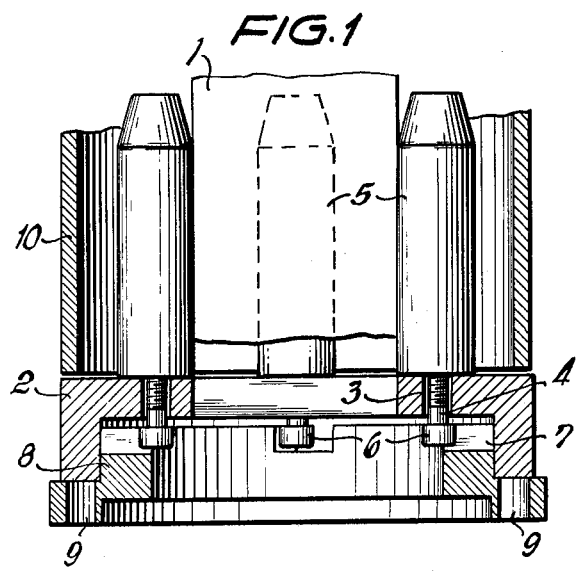
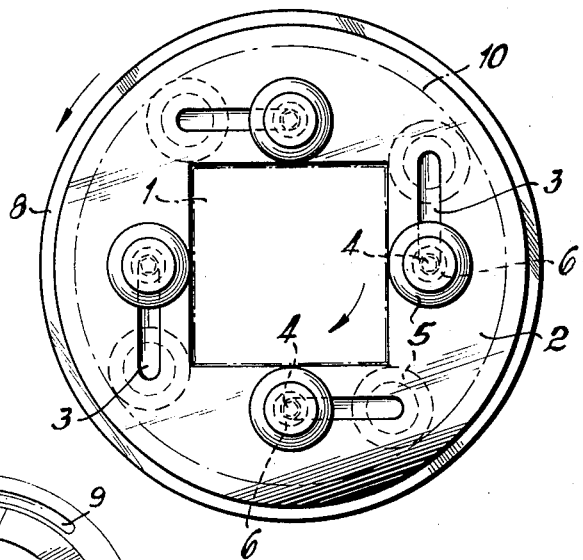
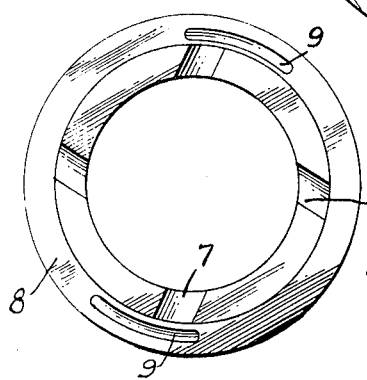
INVENTOR
O. Hachtmann
BY
Richards & Geier
ATTORNEYS INVENTOR
O. Hachtmann
BY
Richards & Geier
ATTORNEYS July 19, 1966 O. HACHTMANN 3,261,565
COUPLING DEVICE Filed Feb. 14, 1964 5 Sheets-Sheet 3

INVENTOR
O. Hachtmann
BY
Richards & Geier
ATTORNEYS

July 19, 1966 O. HACHTMANN 3,261,565
COUPLING DEVICE
Filed Feb. 14 1964 5 Sheets-Sheet 4

INVENTOR
O. Hachtmann
BY
Richards & Geier
ATTORNEYS

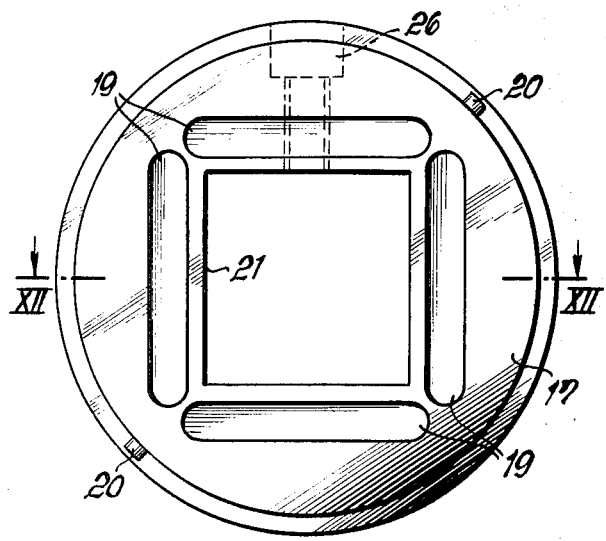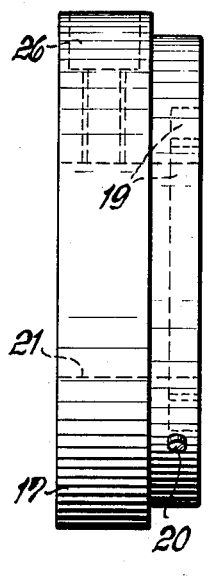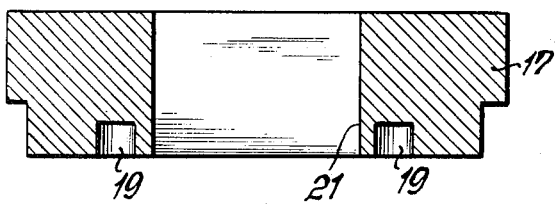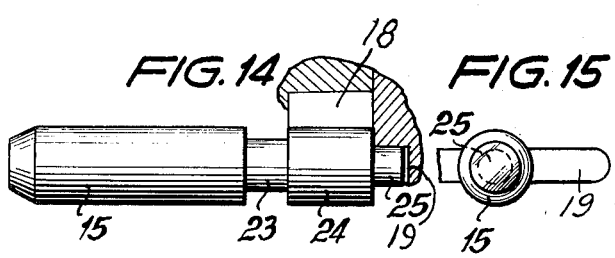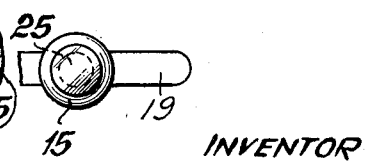

United States Patent Office 3,261,565
Patented July 19, 1966

3,261,565
COUPLING DEVICE
Otto Hachtmann, Alemannstrasse 3, Hannover, Germany
Filed Feb. 14, 1964, Ser. No. 345,023
8 Claims. (Cl. 242—72)

This invention relates to a coupling device for an automatical connection of a hollow cylinder to a shaft. When a conventional coupling is used to connect a shaft with a hollow cylindrical core upon which a web or tape of any material, e.g. of paper, textile or rubber or cables, wires, threads etc. are wound into rolls it is difficult to separate the core from the windup shaft or to exchange the roll. Moreover during the operation of winding up the tape or unwinding the roll the shaft must have a position exactly central to the roll to avoid changing stresses and changing forces in the winding machine. The coupling devices known in the art because of their complicated structure are not fitted for these conditions of working and besides they require a high waste of time for exchanging the rolls.

An object of this invention is the provision of a simpler, more effective and less expensive coupling device which in addition to its coupling function automatically centers hollow cylinders of tape rolls etc. to a shaft.

A further object of the invention is to provide a coupling device which enables a quick and single changing proceeding of the rolls.

Another object of the invention is the provision of an improved structure of a coupling which automatically centralizes hollow cylinders without generating a force in the direction of the shaft.

A still further object of the invention is to provide coupling means in which the entire weight and strain of the roll is transmitted to the shaft only through solid parts within the coupling structure, whereby all other coupling elements may be of small size and are cheaply to manufacture.

Further objects and advantages of the invention will become evident from the following detailed description, taken in conjunction with the accompanying drawings, in which FIG. 1 is an elevation partly in section, of a coupling device, illustrating one embodiment of the invention;

FIG. 2 is a front view of the coupling device;

FIG. 3 is an end view on a reduced scale of a portion of the same;

FIG. 11 is a front view of another portion of the coupling device;

FIG. 12 is a sectional view taken on the lines XII—XII of FIG. 11;

FIG. 13 is a side view of the portion shown in FIG. 11;

FIG. 14 is an elevation of an element of the coupling;

FIG. 15 is a front view of the same.

Figure 4:
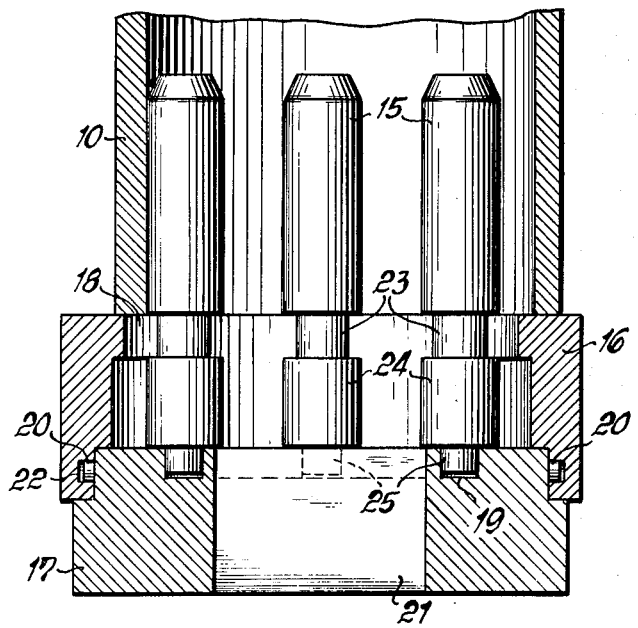
FIG. 4 is a longitudinal sectional view of a modified embodiment of the invention, illustrating the disengaged position of the coupling device, taken on the lines IV—IV of FIG. 5.

In the form of execution illustrated in FIGURES 1 to 3, the reference numeral 1 denotes the end of a horizontal drive shaft, which end has a square cross section. A circular supporting member 2 surrounds said end. The supporting member 2 has four guide slots 3 disposed parallel to the four plane surfaces of squared shaft end 1. Slot 3 receives a bolt 4 engaging a threaded bore of a cylindrical clamping element 5. The clamping elements 5 are carried by the supporting member 2 and are guided in parallel alignment with the axis of the shaft. The heads 6 of the screw bolts 4 engage oblique slots 7 of a guide ring 8 whereby the clamping elements are guided within the oblique slots 7. Guide ring 8 is turnably connected to the supporting member 5 by screws engaging oblong openings 9 of guide ring 8. This makes it easy to assemble the supporting member 2 with the shaft if the clamping elements 5 are in their initial position as shown in full lines in FIG. 2.

The distance of the four guide slots 3 from the plane faces of the squared shaft end 1 is equal to the radius of the four cylindrical clamping elements 5, therefore each of said elements is adjacent one plane face of the squared shaft end 1. The hollow cylinder 10 e.g. the core of a tape wound into a roll is to be coupled with the shaft and is designed to rotate counter-clockwise as illustrated in FIG. 2 by an arrow, or the driving shaft 1 rotates clockwise.

As soon as the hollow cylinder 10 rotates counter-clockwise or the shaft 1 rotates clockwise, at least one of the clamping elements 5 frictionally engaging with shaft 1 will move on from its initial position towards its operating position as shown with dashed lines in FIG. 2 since at least one of the clamping elements 5 transmits the weight of the hollow cylinder 10 to the shaft 1. By rolling along the plane surface of the squared shaft 1 this clamping element 5 will move in outward direction and finally clamps cylinder 10 to shaft 1. The heads 6 of the screw bolts 4 are sliding within the oblique slots 7 of ring 8 and guide the other three clamping elements 5 to the same extent as the driving clamping element 5 and in this manner the hollow cylinder 10 is finally clamped centrally to the shaft. This clamping effect is obtained during the whole time of rotation of the device. When this operation process is finished the weight of cylinder 10 will move at least one clamping element 5 back to its initial position. At the same time the guide ring 8 on account of its openings 9 moves relative to the supporting member 2 and brings the other clamping elements 5 equally back to their initial position by means of the heads 6 of the bolts 4 and the oblique slots 7. The weight and touring force of the hollow cylinder 10 is transmitted to the shaft by the cylindrical clamping elements which engage the wall of the hollow cylinder 10 and to the surfaces of the squared shaft 1 likewise. This insures that the supporting member 2 is at all times free of strain.

The embodiment as illustrated in FIGURES 1 to 3 is designated for a left turn of the hollow cylinder 10 and a right turn of shaft 1 from the starting position, therefore the guide slots 3 of supporting member 2 are disposed between the middle of the squares of shaft 1 and with their rear edges in the direction of rotation of shaft 1. If the device should be constructed for the opposite direction of rotation, the guide slots 3 also are disposed in the opposite direction.

To enlarge the friction effect of the cylindrical clamping elements 5 their surface may be knurled or fluted or surrounded by rubber or other frictional material.

The device of FIGURES 1 to 3 is primarily designated for horizontal shafts and hollow cylinders, but may be used also for inclined or vertical shafts, if it is made sure that the hollow cylinder 10 in its initial position is located excentrically relative to the shaft 1. In this case also one of the clamping elements 5 is rolling by friction upon the internal surface of hollow cylinder 10 to its central clamping position and guides in the described manner also the other clamping elements to their operating position.

Referring now to FIGURES 4 to 15 I have shown a modified embodiment of the invention in which like parts have like reference numerals.

Figure 6:
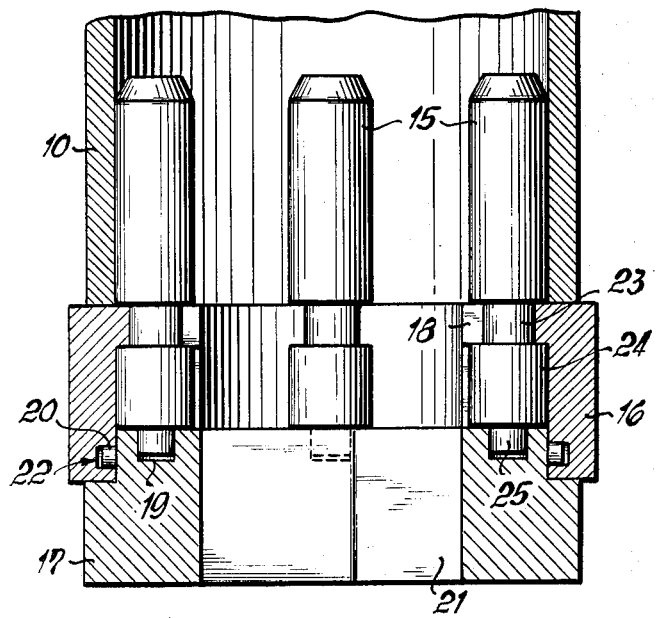
FIG. 6 is a longitudinal sectional view of the embodiment as shown in FIG. 4 in the engaged position of the coupling device, taken on the lines VI—VI of FIG. 7.
Figure 7:
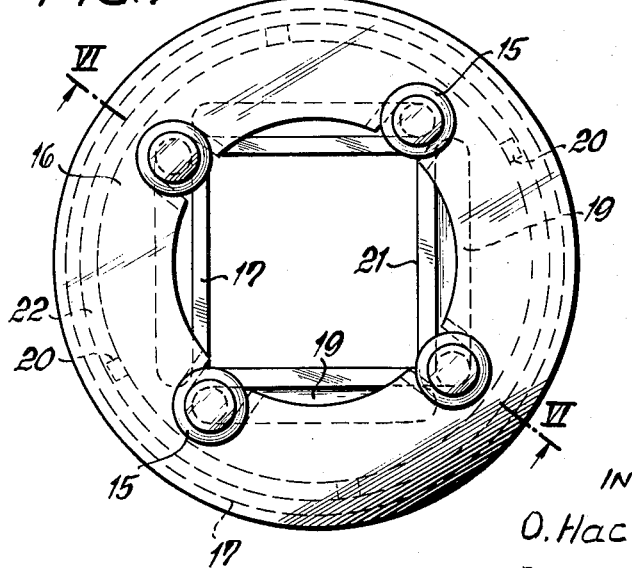
FIG. 7 is a front view of the same.
Figure 8:
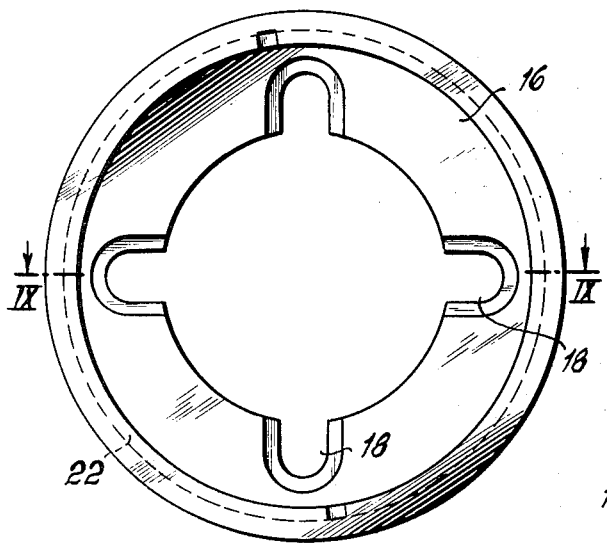
FIG. 8 is an end view of a portion of the coupling device.
Figure 10:
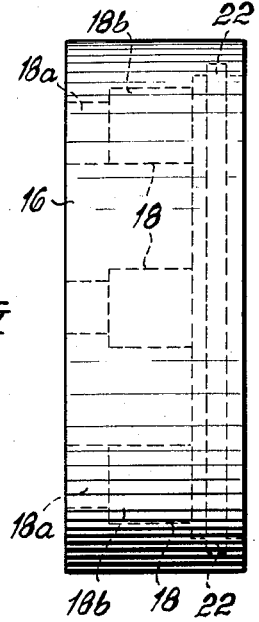
FIG. 10 is a side view of FIG. 9.
Figure 9:
FIG. 9 is a sectional view taken on the lines IX—IX of FIG. 8.

Reference numeral 10 indicates generally the hollow cylinder, e.g. the core of a paper tape roll. The cylinder 10. is to be coupled centrally to a driving shaft by an automatically centering coupling device according to the invention. The cylinder 10 is clamped to the shaft by means of four cylindrical clamping elements 15 which are illustrated in FIGURES 14 to 15. Each clamping element 15 is provided with an annular groove 23, an intermediate cylindrical part 24 and an end pin 25. The annular grooves 23 and the intermediate cylindrical parts 24 are slidably mounted in radial slots 18 of a cage 16, as best seen in FIGURES 8 to 10. Each slot 18 has a part 18a of smaller width which is the same as annular groove 23 of each clamping element 15 and a part 18b working together with the intermediate cylindrical part 24 of each clamping element 15, both parts having identical diameters. The cage 16 is rotatably mounted by a bayonet-closure 20, 22 to a supporting member 17 as best seen in FIGURES 4, 6 and 9. The supporting member 17 has four grooves 19 as best seen in FIGURE 11. The four grooves 19 guide the pin endpieces 25 of the four cylindrical clamping cylinders 15 and are arranged in such a distance from the internal side walls of the squared central opening 21 of the supporting member 17 that the cylindrical clamping elements 15 roll with their surface each upon one plane surface of the squared shaft 1, whereby the opening 21 slidably engages the plane surface of the shaft. The supporting member 17 is provided with a threaded bore 26 for a screw to fasten it to the shaft in a desired position.

Figure 5:
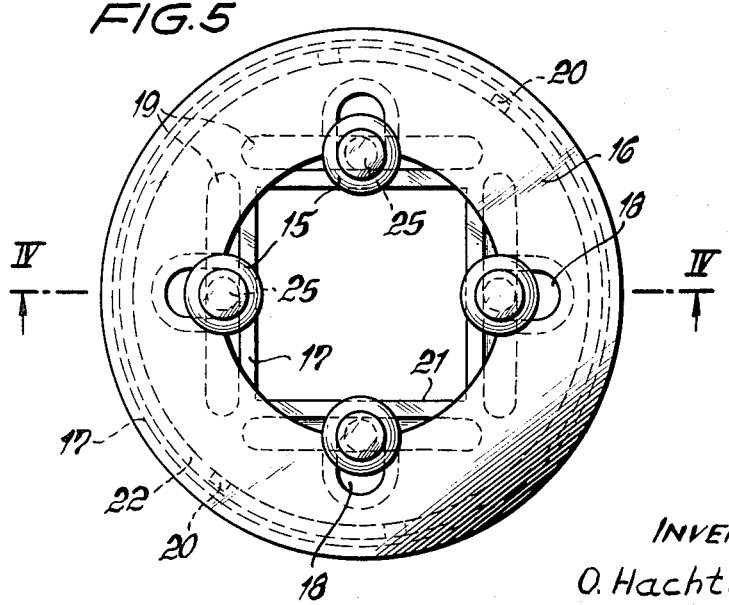
FIG. 5 is a front view of the same.

Having now described the parts of the automatically centering coupling device represented in FIGURES 4 to 15 the operation of this device is as follows:

At first the hollow cylinder 10 is inserted into the machine frame and the shaft 1 together with the coupling device is mounted in the machine, whereby the portions of the device are in the initial position as illustrated in FIGURES 4 and 5. The cylindrical clamping elements 15 are positioned in the middle of each plane surface of the shaft and the cage 16 has the position shown in FIGURES 4 and 5. The diameter of the circle embracing the elements 15 is of smaller diameter than the diameter of the internal surface of the hollow cylinder 10. Therefore the cylinder 10 has an initial position excentric to the axis of the shaft. The shaft may have a horizontal, a vertical or an inclined position. When shaft 1 begins to rotate the cage 16 is rotating against the supporting member 17. In either direction of rotation the cage 16 is finally moved into the position shown in FIGURES 6 and 7 in which the cylindrical clamping elements 15 have reached a position near the edges of the plane surfaces 21 of the shaft.

Since all four elements 15 are guided by the cage 16 their embracing circle remains centrally to shaft 1 and the hollow cylinder 1 is now coupled and automatically centered to shaft 1. It is important that the cylindrical clamping elements 15 transmit the forces e.g. weight and acceleration from the hollow cylinder 10 directly through their cylindrical bodies to the plane surfaces 21 of shaft 1. As shown in the drawings the coupling means of the invention is very small compared with the amount of transmitted power. The coupling will transmit forces as long as the drive shaft 1 or the treating action of cylinder 10 exists. As soon as there is no more tendency for a relative movement between shaft 1 and cylinder 10 both parts are disengaged and cage 16 is returned to its initial position of FIGURES 4 and 5. In cases of a horizontal or inclined shaft 1 the weight of cylinder 10 fully opens at standstill the coupling.

While there are specifically described two embodiments which the invention may assume in practice it will be understood that these structures of the same are only shown for purposes of illustration, and that the invention may be modified and embodied in various other forms without departing from its spirit or the scope of the appended claims.

What I claim is:

1. An automatic coupling device, comprising a hollow cylindrical body, a shaft coaxial to said hollow cylindrical body, said shaft having plane surfaces, clamping elements located parallel to the axial line of said shaft and slidable parallel to said plane surfaces and along one of the sides of said shaft, a supporting member fixed to said shaft, and a guiding member turnable thereon and adapted to guide all of said clamping elements at the same time parallel to and in frictional engagement with said plane surfaces, said hollow cylindrical body in its initial position engaging one of said clamping elements, said one clamping element being shifted upon said plane surface at the beginning of a revolution of said shaft and automatically connecting said hollow cylindrical body to said shaft and centering said hollow cylindrical body, all of said clamping elements being guided by the guiding member in a similar shifting movement.

2. The device of claim 1 in which the number of said clamping elements equals the number of the plane surfaces of said shaft, said clamping elements being coaxial with said hollow cylindrical body.

3. An automatically centering coupling device for revolving drive of a hollow cylinder, comprising a shaft coaxial to said hollow cylinder, several plane surfaces on said shaft, several cylindrical clamping elements, a supporting member fixed to said shaft, a guiding member turnable relatively to said supporting member and supporting said cylindrical clamping elements, and guide means in said supporting element parallel and at a distance to said plane surfaces to guide said clamping elements parallel to and in continuous contact with said plane surfaces, said distance being of the same value as the radius of said clamping elements, at which the hollow cylinder is excentrical to said shaft and touches with its inner surface at least one of said cylindrical clamping elements, whereby said one clamping element will be shifted on that plane surface working with that clamping as soon as the shaft revolves and centralizes the hollow cylinder to the shaft.

4. The coupling device of claim 3 in which one end of each clamping element is guided by the said guide means in said supporting element.

5. The coupling device of claim 3 in which a ring is rotatably connected to said supporting element, provided with recesses arranged oblique to the radial direction, one end of each clamping element passing through said supporting element.

6. An automatically centering coupling device for a drive of a revolving hollow cylinder, comprising a shaft, several plane surfaces on said shaft, several cylindrical clamping elements having end pins, a cage guiding said cylindrical clamping elements in radial slots, a supporting member rotatably connected to said cage and carrying one end of each cylindrical clamping element, grooves guiding the end pins of said clamping elements in said supporting member, said groove being arranged parallel to said plane surfaces in such a distance that the cylindrical clamping elements are in contact with said plane surfaces.

7. The coupling device of claim 6 in which said supporting member has a central opening for engagement with said plane surfaces of the shaft.

8. The coupling device of claim 6 in which said cylindrical clamping elements are guided in said radial slots of said cage, each cylindrical clamping element having a circular groove, said radial slots having a width coinciding with said circular groove.

References Cited by the Examiner

UNITED STATES PATENTS

| | | | |
|---|---|---|---|
| 799,912 | 9/1905 | Masterson | 242—72 |
| 999,191 | 7/1911 | Hunter | 242—72 |
| 2,558,689 | 6/1951 | Miller | 242—72 |

FOREIGN PATENTS

| | | |
|---|---|---|
| 786,900 | 11/1957 | Great Britain. |

STANLEY N. GILREATH, *Primary Examiner.*

M. STEIN, *Examiner.*

N. L. MINTZ, *Assistant Examiner.*